N. HELWIG.
CALIPERS.
APPLICATION FILED DEC. 14, 1911.
1,034,795.
Patented Aug. 6, 1912.
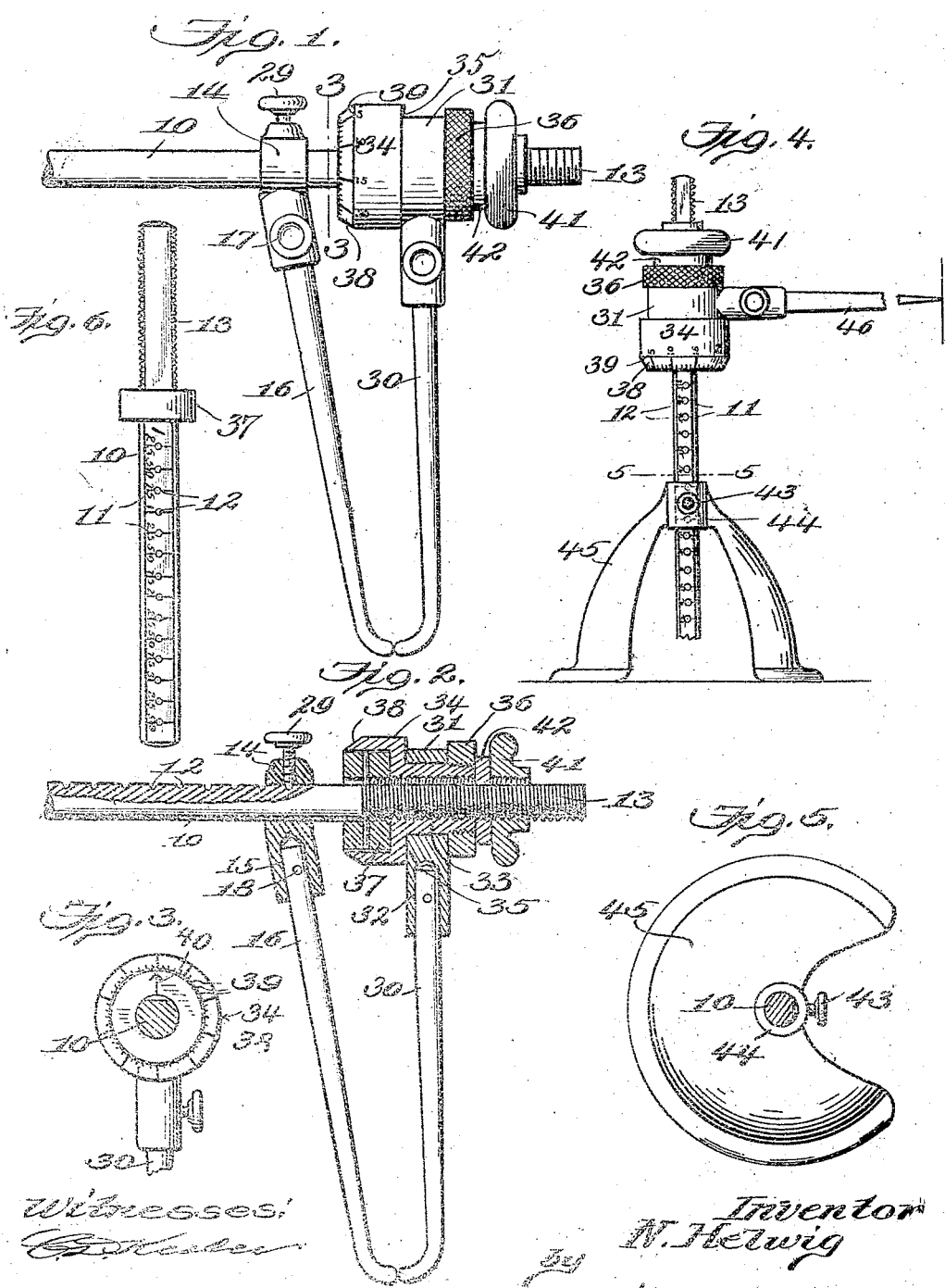

UNITED STATES PATENT OFFICE.

NICHOLAS HELWIG, OF MIDDLETOWN, OHIO.

CALIPERS.

1,034,795. Specification of Letters Patent. Patented Aug. 6, 1912.

Application filed December 14, 1911. Serial No. 665,767.

*To all whom it may concern:*

Be it known that I, NICHOLAS HELWIG, a citizen of the United States, residing at Middletown, in the county of Butler and State of Ohio, have invented certain new and useful Improvements in Calipers, of which the following is a specification.

This invention relates to that type of calipers known as beam calipers, and its object is to provide an instrument of this kind which is capable of fine adjustment, and which may also be arranged so as to be put to various uses.

With these objects in view, the invention consists in a novel construction and arrangement of parts to be hereinafter described and claimed, reference being had to the accompanying drawing forming a part of this specification, in which drawing—

Figure 1 is a side elevation of the instrument; Fig. 2 is a longitudinal section thereof; Fig. 3 is a cross-section on the line 3—3 of Fig. 1; Fig. 4 is an elevation showing a modification; Fig. 5 is a horizontal section on the line 5—5 of Fig. 4; Fig. 6 is a plan view of the beam of the instrument.

Referring specifically to the drawing, 10 denotes the beam of the instrument, the same comprising a straight bar which is partly circular in cross-section, the top being flat. Throughout the major portion of its length, the top of the beam is provided with transverse graduations 11, and central recesses 12 which are intersected by said graduations. The rear end of the beam is screw-threaded as indicated at 13.

On the graduated portion of the beam is slidably mounted a block 14 having a socket 15 to receive one of the caliper legs 16, said leg being removably clamped in the socket by a set screw 17. That portion of the leg which seats in the socket has diametrically opposite recesses 18 to receive the point of the set screw. The leg may be reversed by giving it a half turn after unscrewing the set screw. The block 14 is clamped in adjusted position on the beam 10 by means of a set screw 29, the point of which is adapted to seat in any one of the recesses, according to the adjustment of the block. Upon unscrewing the set screw, the block is free to slide on the beam, and after it is placed in the desired position on the latter, it is securely clamped thereto by operating the set screw in an obvious manner. The other caliper leg is indicated at 30. This leg is carried by a sleeve 31 having a socket 32 in which the leg is clamped in the same manner as the leg 16.

Inasmuch as both legs of the instrument are reversible, they may be set to caliper inside and outside; and as they are also removable, both legs may be removed and divider points put in place thereof, if the instrument is to be used as a divider; or one leg may be removed and one remain, if it is desired to use the instrument as a hermaphrodite caliper.

The sleeve 31 is carried by a nut 33 which is threaded to screw on the threaded end 13 of the beam 10. The forward end of the nut is enlarged in diameter as indicated at 34, which produces a shoulder 35, between which latter and an abutment 36, the sleeve is mounted. The abutment is a nut which screws on the rear end of the nut 33, said end being externally screw-threaded for this purpose. The enlarged forward end 34 of the nut 33 is hollow so that it may fit over a collar 37 which is fixed on the beam 10 and determines the zero point of the scale on the top of said beam. The nut 33 and its enlarged end 34 are circular in cross-section. The front end of the enlargement is beveled off as indicated at 38, and on said beveled surface is a circular series of graduations 39 which denote infinitesimal fractional parts of an inch or other unit of measurement. On the outer end of the collar 37 is an index mark 40 which coöperates with the graduations 39, the latter being numbered, said numbers being located on the outer surface of the part 34, behind the bevel 38.

It will be evident from the foregoing that when the nut 33 is rotated it is caused to travel on the threaded end 13 of the beam 10, thereby carrying the leg 30 toward or from the leg 16, according to the direction the nut is made to travel. The beam has twenty threads to the inch, and the scale formed by the graduations 39 has fifty subdivisions, so that if the nut is rotated a distance equal to one subdivision of the scale, it will travel a distance of one-thousandth part of an inch. The instrument is therefore capable of a very fine adjustment.

In order to lock the nut 33 in adjusted position, there is provided a lock nut 41 which screws on the threaded end 13 of the bea 10 behind the rear end of the nut, and between the latter and the lock nut is interposed a washer 42.

Figs. 4 and 5 show the instrument arranged as a surface gage. In this structure the beam 10 is held vertically by a set screw 43 in a hub 44 formed on a hollow stand or base 45, and the parts which are mounted on the threaded portion of the beam in the first-described structure carry a pointer 46.

I claim:

1. A caliper comprising a graduated beam having a screw-threaded portion, a block adjustably mounted on the graduated portion of the beam, a caliper leg carried by the block, a circular nut mounted on the threaded portion of the beam and having a circular series of graduations, a sleeve mounted on the nut, means for holding the sleeve against longitudinal movement on the nut, a caliper leg carried by the sleeve, and a fixed collar on the beam, said collar having an index mark coöperating with the aforesaid circular series of graduations.

2. A caliper comprising a graduated beam having a screw-threaded portion, a block adjustably mounted on the graduated portion of the beam, a caliper leg carried by the block, a circular nut mounted on the threaded portion of the beam and having an enlargement at one end to produce a shoulder, an abutment on the nut, a sleeve mounted on the nut between the shoulder and the abutment, said nut having a circular series of graduations, a caliper leg carried by the sleeve, and a fixed collar on the beam, said collar having an index mark coöperating with the aforesaid circular series of graduations.

3. A caliper comprising a graduated beam having a screw-threaded portion, a block adjustably mounted on the graduated portion of the beam, a caliper leg carried by the block, a fixed collar on the beam, said collar having an index mark, a circular nut mounted on the threaded portion of the beam, one end of the nut being hollow and fitting over the aforesaid collar, said end of the nut having a bevel which extends to the collar, and said bevel having a circular series of graduations with which the index mark of the collar coöperates, a sleeve mounted on the nut, means for holding the sleeve against longitudinal movement on the nut, and a caliper leg carried by the sleeve.

In testimony whereof I affix my signature in presence of two witnesses.

NICHOLAS HELWIG.

Witnesses:
W. M. BOYD,
CHAS. GRAY.